(12) United States Patent
Abram

(10) Patent No.: US 9,816,414 B2
(45) Date of Patent: Nov. 14, 2017

(54) ADAPTIVE VALVE SPRING RETAINER WITH VIBRATION DAMPING

(75) Inventor: Kwin Abram, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 1424 days.

(21) Appl. No.: 13/413,053

(22) Filed: Mar. 6, 2012

(65) Prior Publication Data

US 2013/0232961 A1    Sep. 12, 2013

(51) Int. Cl.
| F01N 3/00 | (2006.01) |
| F01N 1/16 | (2006.01) |
| F16K 15/03 | (2006.01) |
| F16K 17/04 | (2006.01) |

(52) U.S. Cl.
CPC .............. *F01N 1/16* (2013.01); *F16K 15/033* (2013.01); *F16K 17/0433* (2013.01)

(58) Field of Classification Search
CPC ........................... F16K 17/0433; F16K 15/033
USPC ..... 251/177, 337, 129.04, 129.19, 287, 294, 251/305, 192; 60/320, 324; 137/527, 137/535; 123/361; 267/166, 180, 171
See application file for complete search history.

(56) References Cited

U.S. PATENT DOCUMENTS

| 2,428,708 | A | * | 10/1947 | Heftler | 60/602 |
| 3,760,786 | A | * | 9/1973 | Marsh | 123/198 DB |
| 3,996,961 | A | * | 12/1976 | Siegwart | F16K 1/22 |
| | | | | | 137/517 |
| 4,094,280 | A | * | 6/1978 | Updike | F01L 1/32 |
| | | | | | 123/90.3 |
| 4,998,607 | A | * | 3/1991 | Mizutani | F16D 35/023 |
| | | | | | 192/30 V |
| 6,751,949 | B2 | * | 6/2004 | Tamura et al. | 60/284 |
| 7,051,707 | B2 | * | 5/2006 | Tanimura | F02D 9/1065 |
| | | | | | 123/361 |
| 7,537,196 | B2 | | 5/2009 | Nohl et al. | |
| 8,448,627 | B2 | * | 5/2013 | Kondo et al. | 123/399 |
| 2008/0236680 | A1 | * | 10/2008 | Abram et al. | 137/527 |

FOREIGN PATENT DOCUMENTS

FR    2874234 A1    2/2006

* cited by examiner

*Primary Examiner* — Mark Laurenzi
*Assistant Examiner* — Anthony Ayala Delgado
(74) *Attorney, Agent, or Firm* — Carlson, Gaskey & Olds, PC

(57) ABSTRACT

An adaptive valve assembly includes a pipe defining a passageway for conducting engine exhaust gases, a pivot shaft supported by the pipe, and a valve body coupled to the pivot shaft. The valve body is moveable between an open position where exhaust gas flow through the passageway is increased and a closed position where exhaust gas flow through the passageway is reduced. A resilient member biases the valve body toward the closed position. A retainer assembly includes at least one damping feature that engages the resilient member to dampen vibrations.

35 Claims, 2 Drawing Sheets

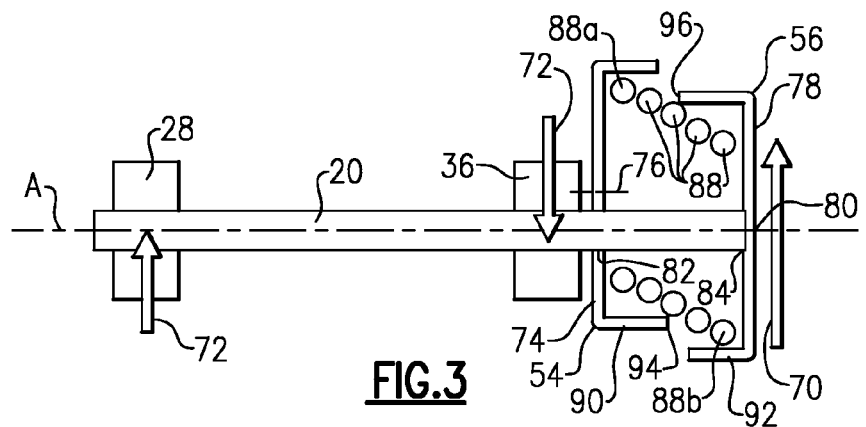

ADAPTIVE VALVE SPRING RETAINER WITH VIBRATION DAMPING

TECHNICAL FIELD

The subject invention relates to an adaptive valve assembly that uses a spring retainer to provide vibration damping.

BACKGROUND OF THE INVENTION

Exhaust systems are widely known and used with combustion engines. Typically, an exhaust system includes exhaust tubes or pipes that convey hot exhaust gases from the engine to other exhaust system components, such as mufflers, resonators, etc. Mufflers and resonators include acoustic chambers that cancel out sound waves carried by the exhaust gases. Although effective, these components are often relatively large in size and provide limited nose attenuation.

One solution for reducing low frequency noise is to use a passive valve assembly. The passive valve assembly includes a flapper valve body or vane that is positioned within an exhaust pipe, with the vane being pivotable between an open position and a closed position. The passive valve is spring biased toward the closed position, and when exhaust gas pressure is sufficient to overcome this spring bias, the vane is pivoted toward the open position. When the exhaust gas pressure falls, the spring causes the vane to return to the closed position.

With the use of the spring, it is difficult to return the vane to a consistent closed position within the exhaust pipe. Further, while effective at attenuating low frequency noise, the introduction of the passive valve into the exhaust system presents additional noise challenges. For example, various components of the valve assembly may vibrate during operation creating an undesirable chattering noise.

SUMMARY OF THE INVENTION

An adaptive valve assembly includes a pipe defining a passageway for conducting engine exhaust gases, a pivot shaft supported by the pipe, and a valve body coupled to the pivot shaft. The valve body is moveable between an open position where exhaust gas flow through the passageway is increased and a closed position where exhaust gas flow through the passageway is reduced. A resilient member biases the valve body toward the closed position. A retainer assembly includes at least one damping feature that engages the resilient member to dampen vibrations.

In one example, the retainer assembly comprises a first retainer piece fixed to a non-rotating structure and a second retainer pieced fixed to the pivot shaft, and the damping feature comprises an offset between the first and second retainer pieces.

In one example, each of the first and second retainer pieces includes an end plate having an opening associated with the pivot shaft, and wherein an opening of one of the end plates is non-concentric with an opening of the other of the endplates to provide the offset.

In one example, the valve assembly includes first and second bearings for rotatably supporting the pivot shaft for rotation relative to the pipe. The offset generates a bearing reaction force in a direction that is non-parallel to the axis of rotation.

In one example, the resilient member comprises a coil spring with a plurality of coils and which includes a first spring end fixed to a non-rotating structure and a second spring end configured for rotation with the pivot shaft. Each of the first and the second retainer pieces includes a transversely extending portion extending axially away from the respective end plate toward the opposite end plate. At least one transversely extending portion is in engagement with at least two coils of the plurality of coils.

In one example, the retainer assembly comprises a first retainer piece fixed to a non-rotating structure and a second retainer pieced fixed to the pivot shaft, and the damping feature comprises a damper that is in engagement with the resilient member.

In one example, the resilient member comprises a coil spring with a plurality of coils and which has a first spring end fixed to a non-rotating structure and a second spring end configured for rotation with the pivot shaft. The damper engages at least one spring coil at a location spaced from the first and the second spring ends.

In one example, the damper engages at least two spring coils and is axially spaced apart from the first and the second retainer pieces.

In one example, the damper engages at least one spring coil and engages at least one of the first and the second retainer pieces.

BRIEF DESCRIPTION OF THE DRAWINGS

FIG. 3 is a schematic view of one example of a retainer assembly with a damping feature.

FIG. 4 is a schematic view of another example of a retainer assembly with a damping feature.

FIG. 5 is a schematic view of another example of a retainer assembly with a damping feature.

DETAILED DESCRIPTION

Figure 1:
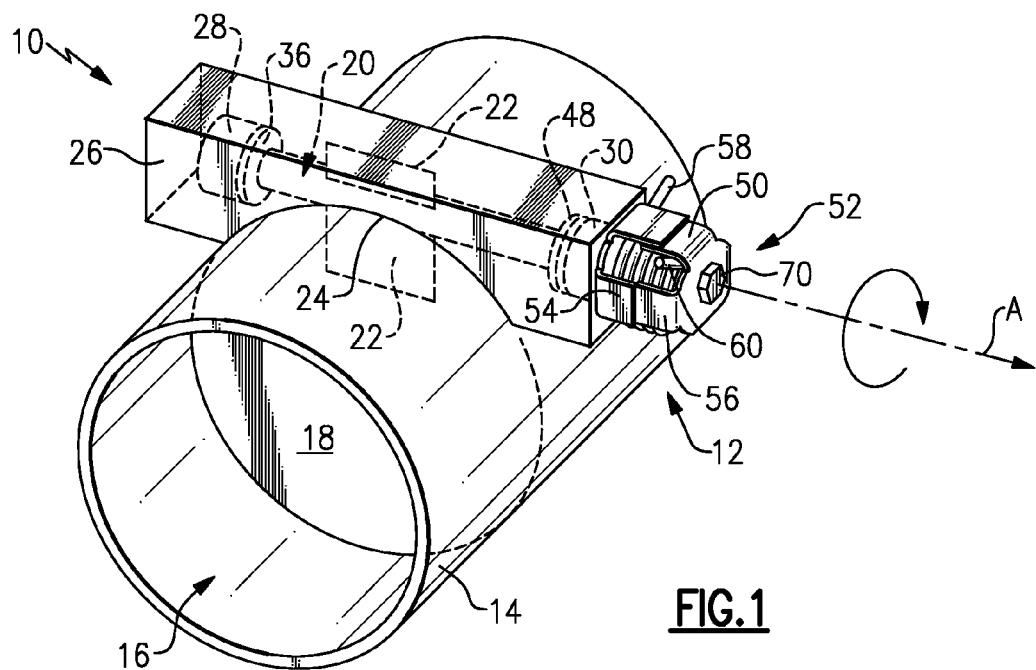
FIG. 1 is a schematic view of a vehicle exhaust component incorporating a passive valve assembly.

FIG. 1 is a schematic view of an exhaust component 10 that includes an exhaust valve assembly 12 that is movable between an open position and a closed position. In the example shown, the exhaust component 10 comprises pipe or a tube body 14 that defines an exhaust gas flow path 16 that conducts heated exhaust gases from an internal combustion engine (not shown) to downstream exhaust components. The exhaust valve assembly 12 includes a valve body 18 that blocks at least a substantial portion of the exhaust gas flow path 16 when in the closed position and is pivoted toward the open position to minimize blockage.

The valve body 18 is fixed to a pivot shaft 20 with a connecting member 22. In one example, a slot 24 is formed within an outer surface of the tube body 14. A housing 26, shown in this example as a square metal structure, is received within this slot 24 and is welded to the tube body 14. Other housing configurations with other shapes and mounting configurations could also be used. The shaft 20 is rotatably supported within the housing 26 by first 28 and second 30 bushings.

In the example shown, the connecting member 22 comprises a piece of sheet metal that has one portion welded to the shaft 20 and another portion that extends outwardly from the housing 26 and is welded to the valve body 18. Thus, the valve body 18 and the shaft 20 pivot together about an axis A. The connecting member 22 is just example of how the shaft 20 can be attached to the valve body 18, it should be understood that other attachment mechanisms could also be used, or the shaft and valve body could be formed together as a single-piece component.

Figure 2:
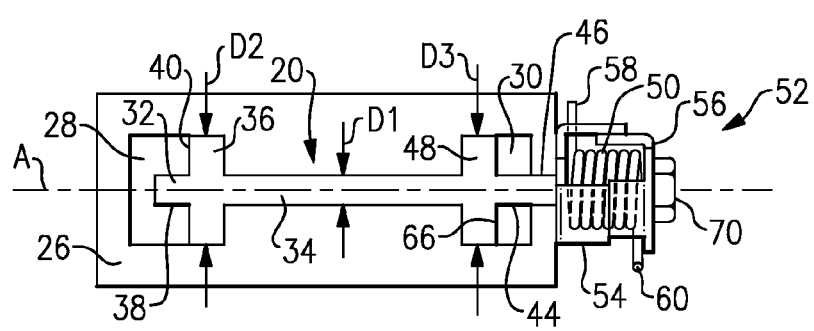
FIG. 2 is a schematic top view of FIG. 1.

The first bushing 28 is positioned generally at a first shaft end 32 as shown in FIG. 2. The first bushing 28 comprises a sealed interface for the first shaft end 32. The shaft 20 includes a shaft body 34 with a first collar 36 near the first shaft end 32. The first bushing 28 includes a first bore 38 that receives the first shaft end 32 such that the first shaft end 32 does not extend axially beyond the first bushing 28. The first collar 36 abuts directly against an end face 40 of the first bushing 28 such that exhaust gas cannot leak out of the first bushing 28 along a path between the shaft 20 and first bushing 28.

The second bushing 30 includes a second bore 44 through which the shaft body 34 extends to a second shaft end 46. The shaft 20 includes a second collar 48 that is located axially inboard of the second bushing 30.

The shaft 20 extends through the second bore 44 to an axially outboard position relative to the second bushing 30. A resilient member, such as a spring 50 for example, is coupled to the second shaft end 46 with a retainer assembly 52. The retainer assembly 52 includes a first retainer piece 54 that is fixed to the housing 26 or pipe body and a second retainer piece 56 that rotates with the shaft 20. One spring end 58 is fixed to a non-rotating structure, such as the first retainer piece 54 for example, and a second spring end 60 is configured to rotate with the shaft 20.

In the example shown, the spring 50 comprises a coil spring that is configured to be compressed both in an axial direction along axis A and in a torsional direction about axis A during installation. Torsional loading creates a preload force that biases the shaft 20 and the valve body 18 toward the closed position. As gas flow increases, this torsional force is overcome to move the valve body 18 toward the open position. The axial force serves to positively seat and seal the second collar 48 against an end face 66 of the second bushing 30. This prevents any exhaust gas from leaking out of the second bushing 30 by sealing off a passage between an outer surface of the shaft 20 and a bore surface of the second bushing 30. Thus, a single spring is used to provide both axial and torsional loading, resulting in a configuration that can both hold the exhaust valve assembly 12 in a desired operational position as well as preventing exhaust gas leakage.

The valve body 18 can only move toward the open position in response to an exhaust gas pressure force that overcomes the biasing force of the spring 50. In other words, the valve comprises a passive valve as opposed to an actively controlled valve where a controller is used to actively move the valve body to a desired valve position.

As discussed above, the spring 50 is associated with a retainer assembly 52. The retainer 52 includes a first retainer piece 54 that is fixed to a non-rotating structure such as the housing 26 or tube body 14, for example, and a second retainer piece 56 that is fixed to the second shaft end 46. In one example, the first retainer piece 54 is secured to the non-rotating structure by welding; however, other attachment methods could also be used. The second retainer piece 56 can be secured to the pivot shaft 20 by a fastener or other any other attachment method.

The retainer assembly 52 includes at least one damping feature that engages the resilient member to dampen vibrations. In one example, the damping feature comprises an offset between the first 54 and the second 56 retainer pieces. Examples of this offset are found in FIGS. 3 and 4.

The example shown in FIG. 3 utilizes the offset to force the spring 50 to create a shaft side load 70 that is in a direction transverse to the axis of rotation. This causes opposing bearing reaction forces 72, which minimizes shaft-to-bearing rattle, often referred to as "chatter." As discussed above, the pivot shaft 20 defines an axis of rotation A about which the second retainer piece 56 and second spring end 60 rotate. The first retainer piece 54 includes a first end plate 74 with a center 76 and the second retainer piece 56 includes a second end plate 78 with a center 80. The first retainer piece 54 includes an opening 82 through which the shaft 20 extends and the second retainer piece 56 includes an opening 84 which receives the shaft 20. The shaft 20 rotates relative to the first retainer piece 54 and rotates with the second retainer piece 56. To create the offset, one of the openings 82, 84 associated with the pivot shaft 20 is offset from the other opening.

In the example shown, the opening 82 in the first end plate 74 is offset from the center 76 of the first end plate 74. In other words the pivot shaft 20 and center 76 of the first end plate 74 are non-concentric with each other. The opening 84 in the second end plate 78 is generally aligned with the center 80 of the second end plate 78, i.e. the pivot shaft 20 and center 80 of the second end plate 78 are generally concentric with each other. Thus, the first 54 and second 56 retainer pieces are offset from each other with one of the pieces being concentric with the pivot shaft 20 and the other piece being non-concentric. It should be understood that the reverse configuration could also be used with the second retainer piece 56 being non-concentric and the first retainer piece being concentric with the pivot shaft 20. Further, both retainer pieces could be non-concentric with the pivot shaft 20; however, the retainer pieces would have to have some degree of offset relative to each other to create the shaft side load 70.

The resilient member comprises a coil spring 50 with a plurality of coils 88 where the first spring end 58 is non-rotating and the second spring end 60 is rotating. The first retainer piece 54 includes one or more transversely extending portions 90 that extend axially away from the first end plate 74 toward the second retainer piece 56. The second retainer piece 56 includes one or more transversely extending portions 92 that extend axially away from the second end plate 78 toward the first retainer piece 54.

In the configuration shown in FIG. 3, a center of the coil 88*a* immediate the first retainer piece 54 is offset from the axis of rotation and the center of the coil 88*b* immediate the second retainer piece 56 is centered on the axis of rotation. This results in the spring having a plurality of coils 88 that are non-concentric with each other. This provides the side load force 70 on the pivot shaft 20 resulting in bearing reaction forces 72 that are in a direction that is non-parallel to the axis of rotation A. The transversely extending portions 90, 92 provide a seat for the end coils 88 and, in one example, extend to respective distal ends 94, 96 that touch at least one other coil 88.

In the example shown in FIG. 4, the first 54 and second 56 retainer pieces are offset from each other in a manner similar to that shown in FIG. 3. However, in this example, one or more of the transversely extending portions 90, 92 are in engagement with at least two coils 88. In the example shown, the first transversely extending portion 90 of the first retainer piece 54 is in direct engagement with the first two coils 88*a*, 88*b* at the non-rotating end of the spring 50, and the second transversely extending portion 92 of the second retainer piece 56 is in direct engagement with the last two coils 88*c*, 88*d* at the rotating end of the spring 50. Touching a second spring coil with one or both of the retainer pieces 54, 56 provides damping to keep the spring 50 from vibrating.

FIG. 5 shows a different configuration that does not require an offset. In this example, the damping feature comprises a damper 100 that is in engagement with the spring 50. The damper 100 comprises a separate component from that of the first 54 and second 56 retainer pieces. In this example, the first 54 and second 56 retainer pieces are generally concentric with the pivot shaft 20 and axis of rotation A.

As discussed above, the coil spring 50 includes a plurality of coils 88, which in this configuration are generally concentric with each other. The damper 100 engages at least one spring coil 88 at a location spaced from the first 58 and the second 60 spring ends. The damper 100 could be located at various different axial positions relative to the coils 88. One example location 102, shown in the upper half of FIG. 5, has the damper 100 engaging at least two spring coils 88a, 88b. In this configuration, the damper 100 is axially spaced apart from the first 54 and the second 56 retainer pieces, i.e. the damper does not contact either of these pieces.

Another example location 104, shown in the lower half of FIG. 5, has the damper 100 engaging one or more spring coils 88c, 88d while also engaging at least one of the first 54 and the second 56 retainer pieces, as indicated at 106. In the example shown, the damper 100 is engaging the second retainer piece 56; however, it should be understood that the damper could optionally engage the first retainer piece. Further, more than one damper 100 could also be used on the spring 50 at any of the various combinations of locations described above. The damper in these examples, provides damping for the spring 50 to keep the spring 50 from vibrating.

The damper is comprised of a resilient material, such as rubber or silicon for example. In one example, the damper 100 comprises an o-ring that surrounds an outer circumference of the spring 50. Other types of dampers and other types of materials could also be used. Further, a damper could be positioned to engage an inner circumference of the spring 50.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An adaptive valve assembly comprising:
a pipe defining a passageway for conducting engine exhaust gases;
a pivot shaft supported by said pipe;
a valve body coupled to said pivot shaft, said valve body moveable between an open position where exhaust gas flow through said passageway is increased and a closed position where exhaust gas flow through said passageway is reduced;
a resilient member biasing said valve body toward said closed position; and
a retainer assembly including at least one damping feature that engages said resilient member to dampen vibrations.

2. The adaptive valve assembly according to claim 1 wherein said retainer assembly comprises a first retainer piece fixed to a non-rotating structure and a second retainer pieced fixed to said pivot shaft, and wherein said damping feature comprises an offset between said first and said second retainer pieces.

3. The adaptive valve assembly according to claim 2 wherein each of said first and said second retainer pieces each include an end plate having an opening associated with said pivot shaft, and wherein a center of one of said end plates is non-concentric with a center of the other of said endplates to provide said offset.

4. The adaptive valve assembly according to claim 3 including first and second bearings for rotatably supporting said pivot shaft for rotation relative to said pipe, and wherein said offset generates a bearing reaction force in a direction that is non-parallel to said axis of rotation.

5. The adaptive valve assembly according to claim 3 wherein said resilient member comprises a coil spring with a plurality of coils and having a first spring end fixed to a non-rotating structure and a second spring end configured for rotation with said pivot shaft, and wherein each of said first and said second retainer pieces includes a transversely extending portion extending axially away from the respective end plate toward the opposite end plate, and wherein at least one transversely extending portion is in engagement with at least two coils of said plurality of coils.

6. The adaptive valve assembly according to claim 5, wherein both of said transversely extending portions are in engagement with at least two coils of said plurality of coils.

7. The adaptive valve assembly according to claim 1, wherein said resilient member has an internal surface surrounding a pivot axis defined by the pivot shaft and an external surface spaced radially outward of the internal surface, and wherein said retainer assembly comprises a first retainer piece fixed to a non-rotating structure and a second retainer pieced fixed to said pivot shaft, and wherein said damping feature comprises a damper that is in engagement with the external surface of said resilient member.

8. The adaptive valve assembly according to claim 7, wherein said resilient member comprises a coil spring with a plurality of coils and having a first spring end fixed to the non-rotating structure and a second spring end configured for rotation with said pivot shaft, and wherein said damper engages at least one spring coil at a location spaced from said first and said second spring ends.

9. The adaptive valve assembly according to claim 8, wherein said damper engages at least two spring coils and is axially spaced apart from said first and said second retainer pieces.

10. The adaptive valve assembly according to claim 8, wherein said damper engages at least one spring coil and engages at least one of said first and said second retainer pieces.

11. The adaptive valve assembly according to claim 7, wherein said pivot shaft defines an axis of rotation, and wherein each of said first and second retainer pieces includes an end plate having a center that is concentric with said axis of rotation.

12. The adaptive valve assembly according to claim 7, wherein said damper comprises an o-ring that surrounds said resilient member.

13. The adaptive valve assembly according to claim 1, wherein the adaptive valve assembly comprises a passive valve where said valve body is solely moveable from said closed position toward said open position in response to an increase in exhaust gas pressure flow against said valve body.

14. An adaptive valve assembly comprising:
a pipe defining a passageway for conducting engine exhaust gases;
a pivot shaft supported by said pipe, said pivot shaft defining an axis of rotation;
a valve body coupled to said pivot shaft, said valve body moveable between an open position where exhaust gas flow through said passageway is increased and a closed position where exhaust gas flow through said passageway is reduced;
a resilient member biasing said valve body toward said closed position; and
a retainer assembly comprising a first retainer piece fixed to a non-rotating structure and a second retainer pieced fixed to said pivot shaft, and wherein one of said first and said second retainer pieces has a center that is non-concentric with a center of the other of said first and second retainer pieces to create an offset between said first and second retainer pieces.

15. The adaptive valve assembly according to claim 14, wherein said first retainer piece includes a first end plate with a first center and said second retainer piece includes a second endplate with a second center, and wherein one of said first and second centers is concentric with said axis of rotation and the other of said first and said second centers is non-concentric with said axis of rotation.

16. The adaptive valve assembly according to claim 14, wherein said resilient member comprises a coil spring including a plurality of coils and having a first spring end fixed to a non-rotating structure and a second spring end configured to pivot with said pivot shaft, and wherein at least one of said plurality of coils is non-concentric with said axis of rotation.

17. The adaptive valve assembly according to claim 14, including first and second bearings for rotatably supporting said pivot shaft for rotation relative to said pipe, and wherein said offset generates a bearing reaction force in a direction that is non-parallel to said axis of rotation.

18. The adaptive valve assembly according to claim 14, wherein said resilient member comprises a coil spring with a plurality of coils and having a first spring end fixed to a non-rotating structure and a second spring end configured for rotation with said pivot shaft, and wherein each of said first and said second retainer pieces includes an endplate with a transversely extending portion extending axially away from the respective end plate toward the opposite end plate, and wherein at least one transversely extending portion is in engagement with at least two coils of said plurality of coils.

19. The adaptive valve assembly according to claim 18, wherein both of said transversely extending portions are in engagement with at least two coils of said plurality of coils.

20. The adaptive valve assembly according to claim 18, wherein at least one of said plurality of coils is non-concentric with said axis of rotation.

21. An adaptive valve assembly comprising:
a pipe defining a passageway for conducting engine exhaust gases;
a pivot shaft supported by said pipe, said pivot shaft defining an axis of rotation;
a valve body coupled to said pivot shaft, said valve body moveable between an open position where exhaust gas flow through said passageway is increased and a closed position where exhaust gas flow through said passageway is reduced;
a resilient member biasing said valve body toward said closed position; and
a retainer assembly comprising a first retainer piece fixed to a non-rotating structure, a second retainer pieced fixed to said pivot shaft, and a damper that is in engagement with said resilient member.

22. The adaptive valve assembly according to claim 21, wherein said resilient member comprises a coil spring with a plurality of coils and having a first spring end fixed to the non-rotating structure and a second spring end configured for rotation with said pivot shaft, and wherein said plurality of coils have an internal surface surrounding a pivot axis defined by the shaft and an external surface spaced radially outward of the internal surface, and wherein said damper engages the external surface of at least one coil at a location spaced from said first and said second spring ends.

23. The adaptive valve assembly according to claim 22, wherein said damper engages at least two coils and is axially spaced apart from said first and said second retainer pieces.

24. The adaptive valve assembly according to claim 22, wherein said damper engages at least one coil and engages at least one of said first and said second retainer pieces.

25. The adaptive valve assembly according to claim 21 wherein said damper comprises a resilient material and is axially spaced apart from said first and second retainer pieces.

26. The adaptive valve assembly according to claim 25 wherein said damper comprises an o-ring.

27. The adaptive valve assembly according to claim 21 wherein said damper comprises a resilient material and wherein said damper is in direct abutting contact with at least one of said first and second retainer pieces and in direct abutting contact with said resilient member.

28. The adaptive valve assembly according to claim 27 wherein said damper comprises an o-ring.

29. The adaptive valve assembly according to claim 1 wherein the pivot shaft defines an axis of rotation, and wherein the damping feature engages the resilient member to provide a side load force on the pivot shaft to generate bearing reaction forces that are in a direction that is non-parallel to the axis of rotation.

30. The adaptive valve assembly according to claim 2 wherein said offset comprises a radial offset.

31. The adaptive valve assembly according to claim 14 wherein said offset comprises a radial offset.

32. The adaptive valve assembly according to claim 14, wherein the valve body comprises a passive valve where said valve body is solely moveable from said closed position toward said open position in response to an increase in exhaust gas pressure flow against said valve body.

33. The adaptive valve assembly according to claim 21, wherein the valve body comprises a passive valve where said valve body is solely moveable from said closed position toward said open position in response to an increase in exhaust gas pressure flow against said valve body.

34. The adaptive valve assembly according to claim 21, wherein a first end face of the resilient member directly faces the first retainer piece and a second end face of the resilient member directly faces the second retainer piece.

35. The adaptive valve assembly according to claim 1, wherein a first end face of the resilient member directly faces the first retainer piece and a second end face of the resilient member directly faces the second retainer piece.

* * * * *